May 13, 1941.  D. W. EXNER  2,241,811
REGULATING SYSTEM
Filed May 31, 1940

WITNESSES:

INVENTOR
Donald W. Exner.
BY
ATTORNEY

Patented May 13, 1941

2,241,811

UNITED STATES PATENT OFFICE 2,241,811

REGULATING SYSTEM

Donald W. Exner, Forest Hills, Pa., assignor to Westinghouse Electric & Manufacturing Company, East Pittsburgh, Pa., a corporation of Pennsylvania Application May 31, 1940, Serial No. 338,089

4 Claims. (Cl. 171—223)

This invention relates to voltage regulating systems.

In voltage regulators it is desired to employ apparatus and particularly magnetic operating elements which are light in weight, low in cost and highly sensitive. Different apparatus has been developed meeting these requirements, but it has been found that the operating characteristics of such equipment are not altogether satisfactory. For example, in the simpler and lighter types of magnetic elements, such as those utilized in a commercial type of regulator, the overall pull curve with respect to position is definitely non-linear, rendering it extremely difficult to properly match it with the calibrating spring characteristic. In such cases it has been necessary to employ compounding in proportion to load current or field current in an effort to improve the operating characteristics. Such compounding has, however, not been entirely satisfactory since it effects a change of the entire overall pull curve.

An object of this invention is to provide a regulating system for a generator including opposed windings for controlling the operation of a voltage controlling resistor in accordance with a function of the generator voltage.

Another object of this invention is to provide for regulating the output voltage of a generator having two parallel connected field windings by utilizing a compounding winding in series with one of the field windings for cooperating with a winding responsive to the output voltage of the generator for controlling the operation of a voltage controlling resistor in accordance with the function of the generator voltage.

Figure 1:
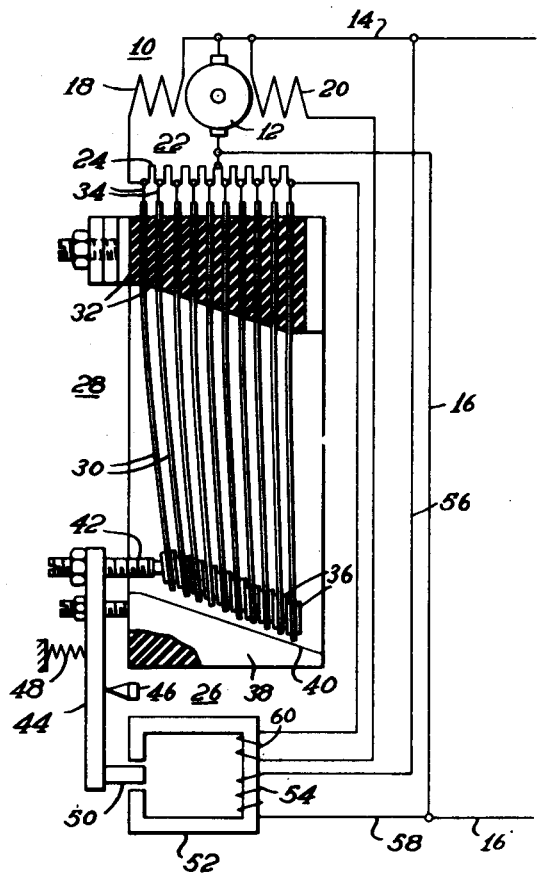
Figure 2:
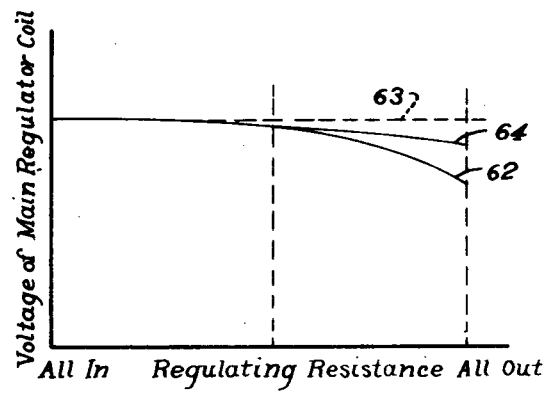

Other objects and advantages of this invention will be apparent from the following description when taken in conjunction with the accompanying drawing, in which:

Figure 1 is a diagrammatic view of the improved apparatus and system embodying the features of this invention; and Fig. 2 is a graph, the curves of which illustrate the operating characteristic of a system embodying the features of this invention as compared with the operating characteristic of a similar system which lacks one of the features of this invention.

Referring to Fig. 1 of the drawing, the invention is illustrated by reference to a regulating system for regulating the voltage of a generator 10. The generator 10 illustrated is driven by any suitable prime mover, not shown, and comprises an armature 12 electrically connected as by conductors 14 and 16 to any given load which is to be supplied. In the particular embodiment illustrated, the generator 10 is provided with a plurality of shunt field windings 18 and 20 connected in parallel across the armature 12. In order to control the energization of the field windings 18 and 20, a resistor 22 having a plurality of resistor sections 24 is associated with the field windings 18 and 20 and so disposed that a different portion of the resistor 22 is electrically connected in series circuit relation with each of the field windings 18 and 20.

As illustrated, the variable resistor 22 comprises one of the elements of a rheostatic controller which controls the energization of the field windings 18 and 20 in response to the output voltage of the generator 10. In order to control the number of resistor sections 24 in circuit with the field windings 18 and 20, respectively, and to control the manner in which the resistor sections are included in the circuit, a control unit comprising a magnetic structure 26 and a leaf spring assembly 28 is provided and so associated with the resistor 22 and the conductors 14 and 16 as to effectively control the electrical connections of the resistor sections 24.

The leaf spring assembly 28 corresponds in structure to that disclosed in the copending application of C. R. Hanna, et al., Serial No. 203,876, filed April 23, 1938, for Regulators, and assigned to the same assignee as this invention. Without going into a detailed discussion of the leaf spring assembly 28, it comprises a plurality of leaf springs 30 arranged in a stack having their fixed ends insulated from each other by layers 32 of fish paper or other suitable insulating material and connected by conductors 34 to a plurality of points or taps between the resistor sections 24 of resistor 22. The opposite ends of the leaf springs 30 carry suitable contact members 36 and are biased into engagement with a stop 38 of any suitable insulating material. The stop 38 is provided with a sloping surface 40 for limiting the motion of the leaves in one direction and for spacing the free ends of the spring leaves 30 out of circuit closing engagement. The driving element 42 carried by a movable arm 44 actuates the leaf springs 30 away from the stop when actuated, as will be explained more fully hereinafter.

In practice, the stop 38 is so positioned on the supporting base of the assembly and with respect to the ends of the leaf springs 30 that the springs are actuated against the sloping stopping surface 40 with a slight loading or biasing force and are accurately spaced from one another at their free ends regardless of a lack of straightness of the individual leaves 30. Although not shown in the drawing, the stop 38 is usually disposed for movement about a given point on the supporting base of the assembly to vary the angle of the sloped stopping surface 40 relative to the ends of the spring leaves 30, whereby the spacing between the leaves will be increased by a counter-clockwise movement of the stop 38 or decreased by a clockwise movement of the stop. Such an arrangement of the spring leaves 30 and the stop 38 permits a free unrestricted movement of the spring leaves 30 in a direction away from the sloping surface 40 of the stop 38.

The magnetic structure 26 employed in conjunction with the spring leaf assembly 28 for controlling the movement of the spring leaves 30 can be of any suitable arrangement, or as illustrated, the arrangement of the magnetic structure for mounting and actuating the movable arm 44 may correspond to that disclosed in a copending application of Ralph A. Geiselman, Serial No. 219,217, filed July 16, 1937, for Regulators, and assigned to the same assignee as this invention. The magnetic structure 26 diagrammatically illustrated is provided with a pivot 46 about which the movable lever arm 44 is adapted to move against the bias of a spring 48 in accordance with the force exerted on an armature 50 carried by the movable arm 44 and positioned within an air gap of the stationary core 52 of the magnetic circuit energized by winding 54. The winding 54 is so connected by conductors 56 and 58 as to be energized in accordance with the voltage across conductors 14 and 16.

As embodied in the system of this invention, the core structure 52 also carries a compounding winding 60 which is electrically connected in series with the field winding 20 and the resistor sections 24 associated with the field winding 20. This compounding winding 60 is so disposed on the core member 52 as to magnetically oppose the winding 54, so that, as will be explained more fully hereinafter, a higher voltage across conductors 14 and 16 will be required to effect the operation of the driving member 42 in controlling the number of resistor sections connected in circuit with the field winding 20.

Although illustrated for an extreme condition of the circuit, the magnetic structure 26 and leaf spring assembly 28 are usually so arranged that for a given voltage across conductors 14 and 16 the magnetic pull on the armature 50 balances the force of the spring 48 to maintain the lever arm 44 in such a position as to permit a portion of the spring leaves 30 to be spaced apart, thereby electrically connecting a portion or a number of the resistor sections 24 in circuit with the field windings 20 and 18.

In operation, assuming that the prime mover, not shown, is operating the generator 10 at a given speed for developing a given voltage across conductors 14 and 16, the winding 54 is energized in accordance with the voltage across the conductors 14 and 16 so as to normally effect the separation of the spring leaves 30 beginning at the righthand side of the stack and progressing towards the left while at the same time by reason of the separation of the contact members 36 carried by the spring leaves 30, progressively introducing resistor sections 24, beginning at the right-hand terminal of the resistor 22, and progressing to the other terminal of the resistor.

Referring to Fig. 2 of the drawing, the operating characteristic in terms of the voltage of the main regulator coil plotted against the amount of regulating resistance in the field circuit is illustrated by curve 62 and shows a decided droop from the desired voltage 63 when all of the regulating resistor is shunted from the circuit with the field windings. As is quite apparent, it is desired to so raise this curve that it approximates the desired output voltage of the generator for all points of the curve. Thus with the prime mover initiating the actuation of the generator to deliver a predetermined voltage across conductors 14 and 16, as the voltage tends to increase to the predetermined voltage instead of securing an operation of the spring leaf assembly 28 to insert resistor sections 24 in circuit with the field winding 20 at the low output voltage indicated by the extreme right point of curve 62, the compounding winding 60 of this invention magnetically opposes the effect of the winding 54 to permit the generator 10 to deliver a higher voltage approximating the desired output voltage as represented by curve 64 of Fig. 2 before the magnetic pull of the magnetic structure 26 becomes of sufficient value to effect the operation of the resistor actuating mechanism to effect a progressive insertion of the resistor sections 24 in series with the field winding 20.

As is evident from the drawing with the compounding winding 60 magnetically opposing the main winding 54, the spring leaves 30 which control the insertion of the resistor sections 24 associated with the field winding 20 are effected at a substantially higher output voltage which approximates the desired output voltage than if the compounding winding 60 is omitted from the circuit. Further, since the compounding winding 60 is connected in series circuit with the field winding 20 and the resistor sections 24 associated therewith, the strength of the winding for magnetically opposing the main winding 54 progressively diminishes as the resistor sections 24 are progressively inserted in series with the field winding 20. With all of the resistor sections 24 connected in circuit with the field winding 20, the compounding winding 60 has a constant strength and has no further effect on the shape of the regulated voltage curve, as illustrated in Fig. 2, when additional resistor sections 24 associated with the field winding 18 are progressively connected in series with the field winding 18.

In operation, assuming the generator 10 is impressing a predetermined voltage on the conductors 14 and 16, and all of the resistor sections 24 are connected in series circuit relation with the field winding 20 and a portion of the resistor sections 24 are connected in series circuit relation with the field winding 18, then if for any reason the voltage across conductors 14 and 16 is decreased, the winding 54 is accordingly deenergized, while the winding 60 remains constant and the driving member 42 biased by the spring member 48 actuates the spring leaves 30 towards the right away from the stop 38 to progressively short circuit or shunt more of the resistor sections 24 from series circuit relation connections with the field winding 18. If such shunting of the resistor sections associated with the field winding 18 is insufficient to effect the energization of the winding 18 to produce the desired increase in the generator voltage, additional sections 24 of the resistor 22 which are associated with the field winding 20 are shunted, thereby so varying the energization of the compounding winding 60 that a higher output voltage from the generator 10 is necessary to effect further change in the number of resistor sections connected in the circuit with the field winding 20. The change in the setting of the resistor sections 24 connected in series circuit relation with winding 20 effectively increases the energization of the winding 20 and thereby increases the generator voltage.

If for any reason the voltage across conductors 14 and 16 should increase above a desired rate of value, the winding 54 is further energized, the winding 60 remaining constant to actuate the driving member 42 from its engagement with the spring leaves 30 to connect the resistor sections in series with the field winding 18 to decrease the energization of the winding and thereby decrease the voltage delivered by the generator 10.

With the regulating system of this invention utilizing a plurality of shunt fields connected in parallel and the variable resistor having a different portion connected in series circuit relation with each of the field windings and the associated apparatus disposed to progressively control the number of resistor sections introduced in circuit with the respective field windings and the compounding winding associated with one of the field windings and its associated resistor sections, it is evident that a very sensitive control of the voltage generated is obtained. In addition to the advantages of the compounding coil for obtaining operation of the resistor operating mechanism at a higher voltage than would be the case if the compounding were not employed, it is evident that with the resistor sections connected in series circuit relation as described that the energization of the field windings is secured in a predetermined sequence which, since the effects of the field windings on the generated voltage are cumulative, provides for good regulation of the generated voltage at a value which approximates the desired generated voltage throughout the operating range of the resistor regulating mechanism.

By providing the compounding, as described hereinbefore, so that it affects the operation of only that portion of the resistor sections 24 associated with the one field winding, it is evident that improved sensitivity of the control of the output voltage of a generator is secured, since only the droopy end of the pull curve is so affected as to approximate a desired operating characteristic while the other end which normally does approximate the desired generated voltage is unaffected. With the regulating system of this invention consistent operation is secured having an overall sensitivity of approximately plus or minus 2%.

Although this invention has been described with reference to a particular embodiment thereof, it is, of course not to be limited thereto, except insofar as is necessitated by the prior art and the scope of the appended claims.

I claim as my invention:

1. In a voltage regulating system, in combination, a generator, the voltage of which is to be regulated, the generator being provided with a plurality of shunt field windings, a rheostat for controlling the voltage impressed on the shunt windings, means for actuating the rheostat, the rheostat actuating means comprising a compounding winding connected in series circuit relation with a field winding and a second winding connected across the generator and disposed to oppose the magnetic field induced by the compounding winding, the compounding winding and the opposed winding thereby cooperating to control the operation of the rheostat operating means in accordance with a function of the generator voltage.

2. In a voltage regulating system, in combination, a generator the voltage of which is to be regulated, the generator being provided with a plurality of shunt field windings connected in parallel circuit relation, a resistor having a plurality of resistor sections disposed to be connected in series circuit relation with the field windings respectively in a predetermined sequence for controlling the voltage impressed on the windings, means for actuating the resistor comprising a compounding winding connected in series circuit relation with one of the field windings and the resistor sections associated therewith and a second winding connected across the generator and disposed to oppose the magnetic field induced by the compounding winding, the compounding winding and the opposed winding thereby cooperating to control the operation of the resistor operating means in accordance with a function of the generator voltage.

3. In a voltage regulating system, in combination, a generator, the voltage of which is to be regulated, the generator being provided with a plurality of shunt field windings connected in parallel circuit relation, a resistor having a plurality of resistor sections disposed to be connected in series circuit relation with the field windings respectively in a predetermined sequence, means for progressively varying the number of the resistor sections connected in circuit with the field windings for controlling the energization of each field winding, and means for actuating the progressive varying means comprising a compounding winding connected in series circuit relation with one of the field windings and the resistor sections associated therewith and a second winding connected across the generator and disposed to oppose the magnetic field induced by the compounding winding, the compounding winding and the opposed winding thereby cooperating to control the operation of the resistor operating means in accordance with a function of the generator voltage.

4. In a voltage regulating system, in combination, a generator, the voltage of which is to be regulated, the generator being provided with two shunt field windings connected in parallel circuit relation, a variable resistor having a plurality of resistor sections disposed to be connected in series circuit relation with the field windings respectively in a predetermined sequence, means responsive to the output voltage of the generator for progressively varying the number of resistor sections connected in circuit with the field windings for controlling the energization of the field windings in a predetermined sequence, and means comprising a compounding winding connected in series circuit relation with one of the field windings and the resistor sections associated therewith disposed to cooperate with the means responsive to the voltage of the generator whereby the progressive variation of the resistor sections throughout the range of the resistor is obtained to maintain the output voltage of the generator substantially at rated value.

DONALD W. EXNER.